July 10, 1928.                                              1,676,799
                    T. C. PROUTY ET AL
       MEANS FOR SUPPORTING AND EXPOSING CERAMIC PRODUCTS
                IN THE COURSE OF THEIR PRODUCTION
                    Filed April 2, 1927        4 Sheets-Sheet 1
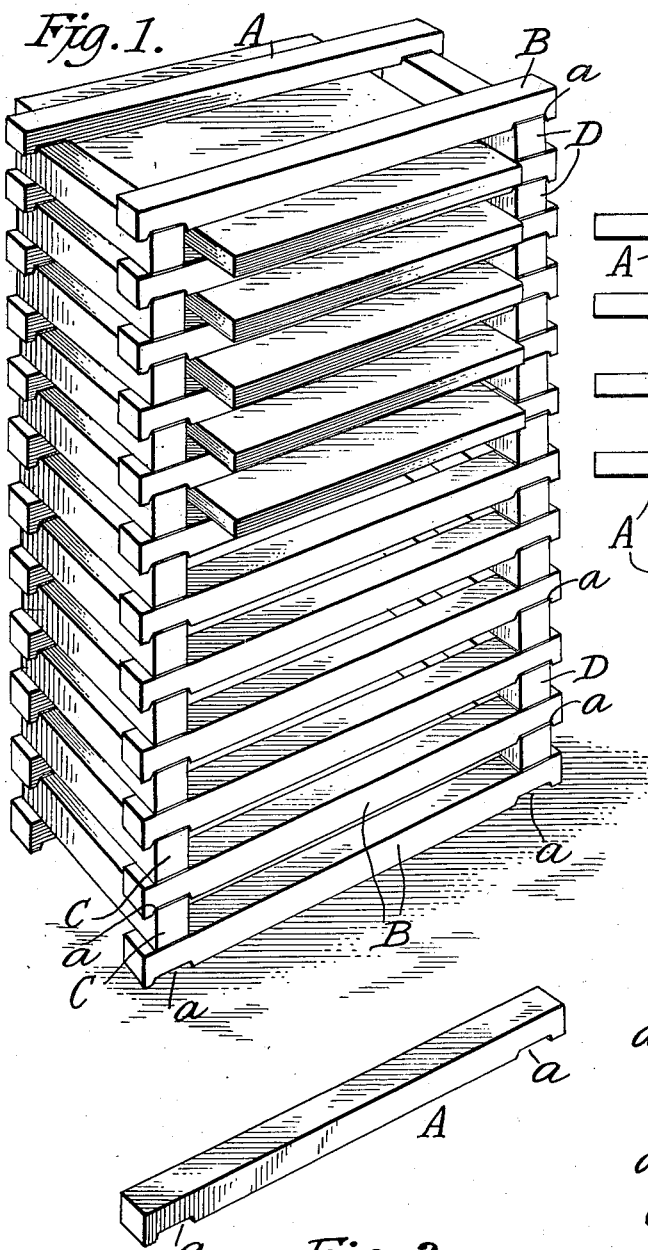
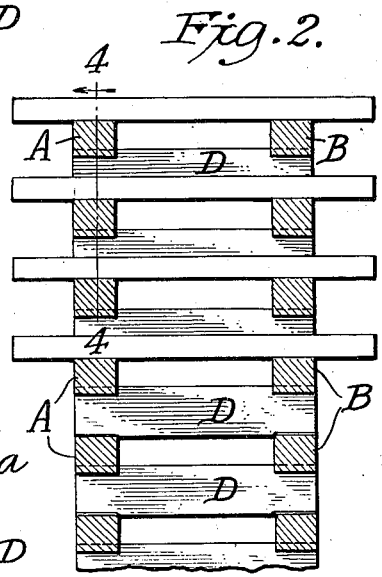
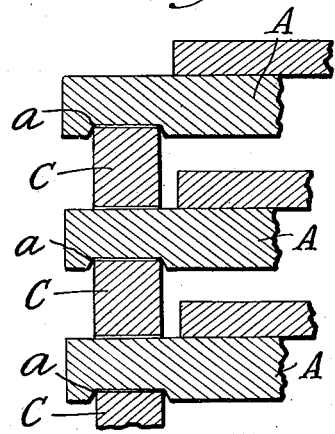
INVENTOR
Theodore C. Prouty and
Willis O. Prouty,
BY
ATTORNEY

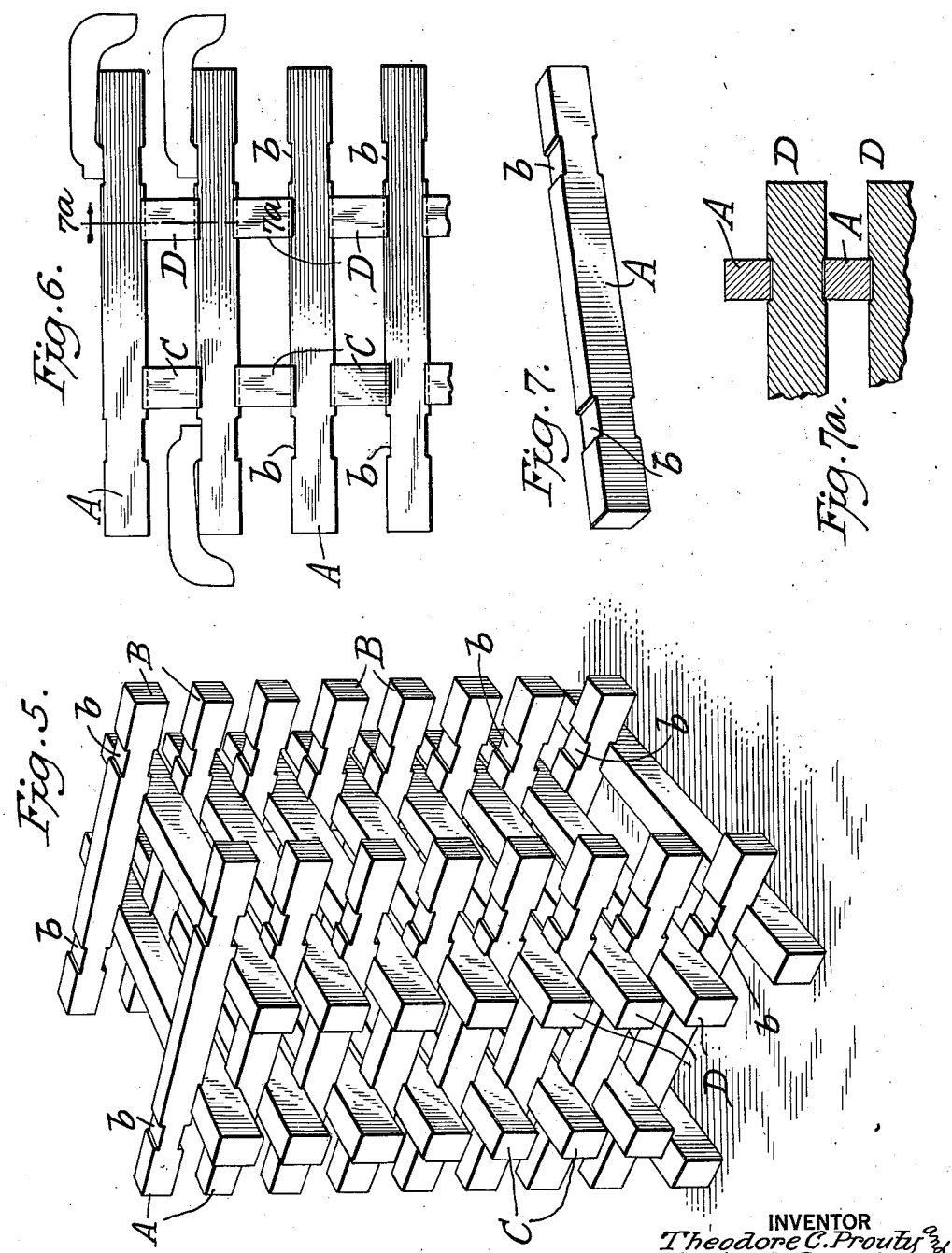

July 10, 1928.
T. C. PROUTY ET AL
MEANS FOR SUPPORTING AND EXPOSING CERAMIC PRODUCTS
IN THE COURSE OF THEIR PRODUCTION
Filed April 2, 1927
1,676,799
4 Sheets-Sheet 3
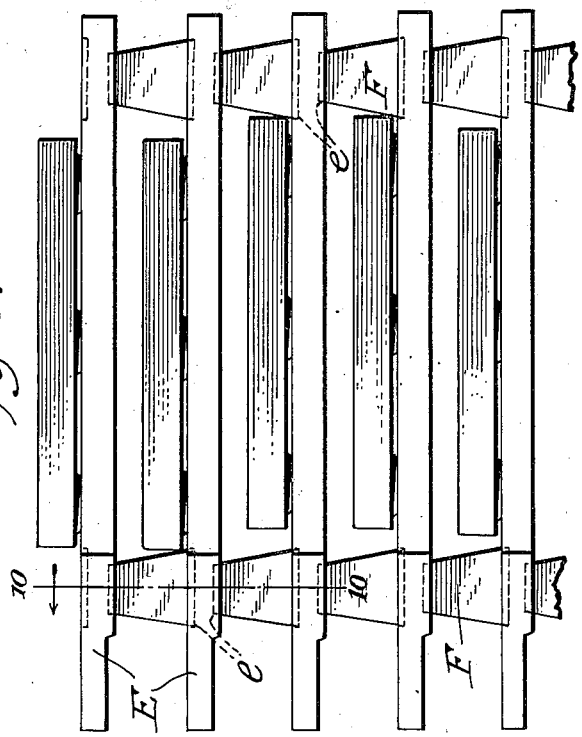
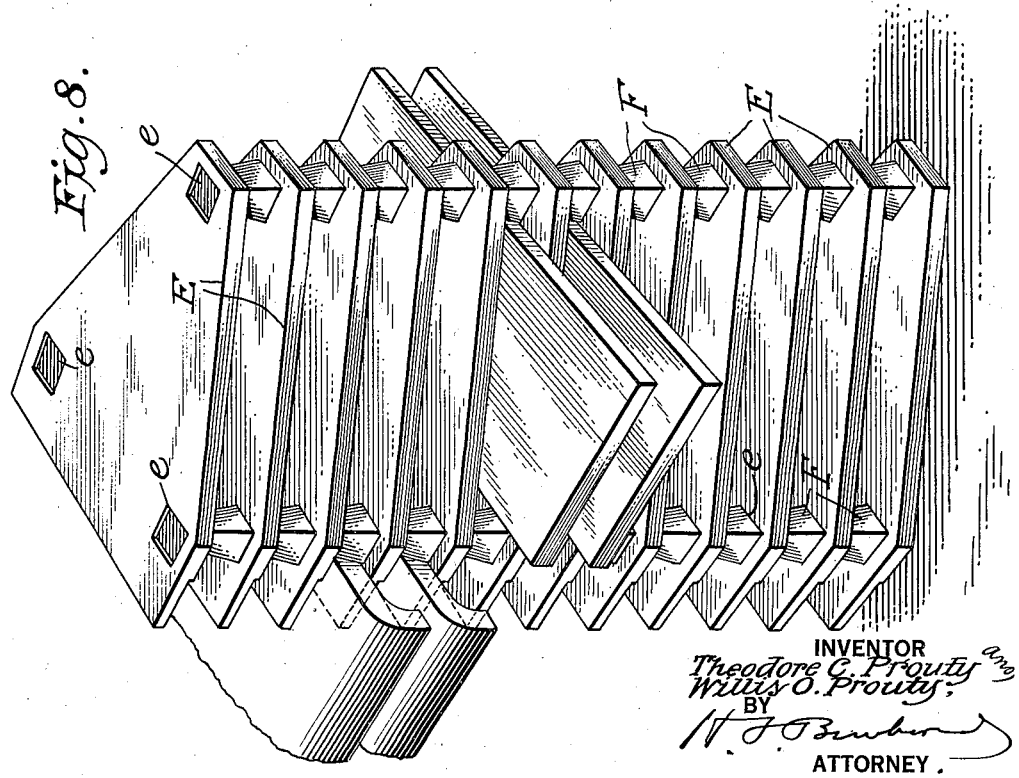
INVENTOR
Theodore C. Prouty and
Willis O. Prouty;
BY
ATTORNEY.

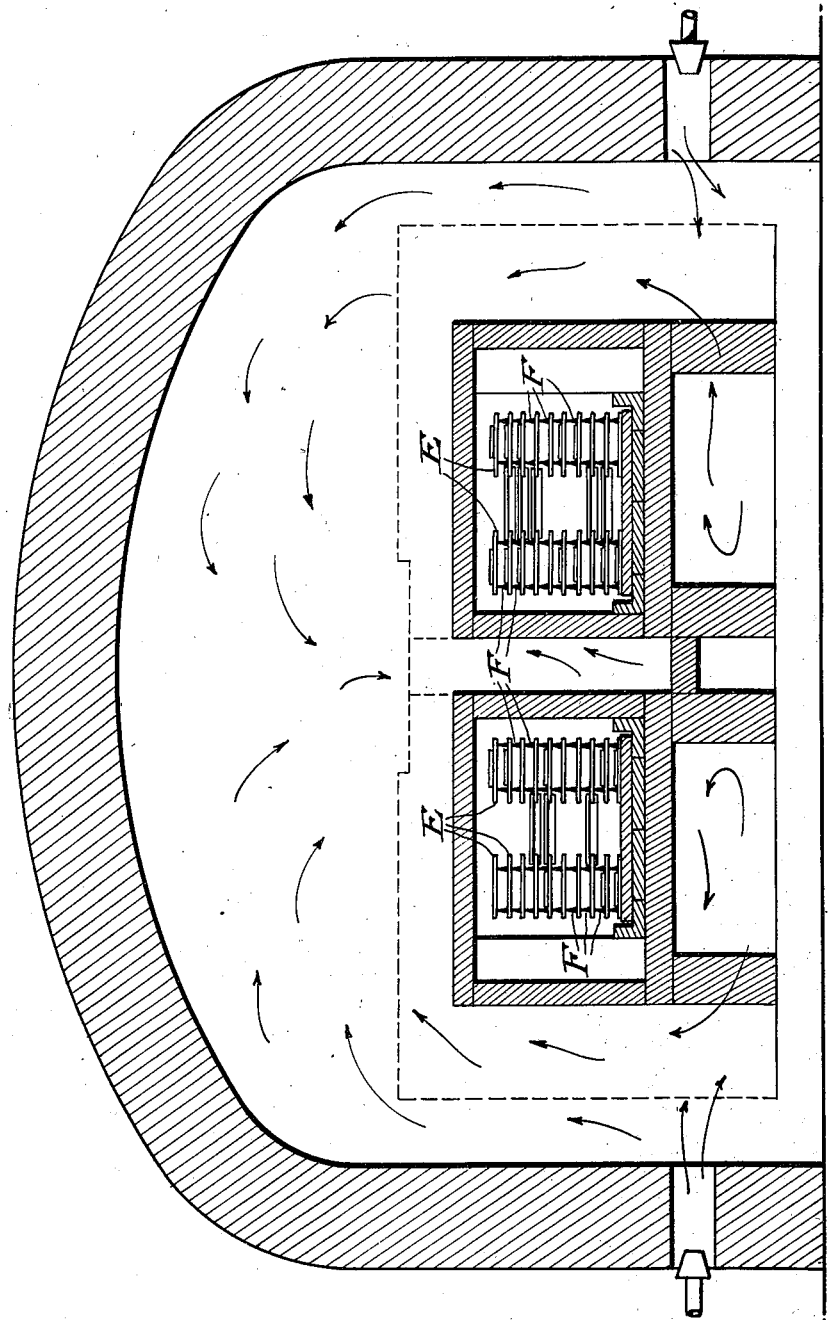

Patented July 10, 1928.

1,676,799

UNITED STATES PATENT OFFICE.

THEODORE C. PROUTY AND WILLIS OSWALD PROUTY, OF HERMOSA BEACH, CALIFORNIA, ASSIGNORS TO AMERICAN ENCAUSTIC TILING COMPANY, LTD., OF NEW YORK, N. Y., A CORPORATION OF NEW YORK.

MEANS FOR SUPPORTING AND EXPOSING CERAMIC PRODUCTS IN THE COURSE OF THEIR PRODUCTION.

Application filed April 2, 1927. Serial No. 180,402.

This invention is a device for supporting and exposing ceramic products in the course of the production of ceramic articles of one kind or another.

Among the objects of the invention are to provide for the support of a substantial number of ceramic products and for the exposure of all such products to the action of heat within a kiln of one form or another; to enable the operations of loading the carrying device with ceramic products to be conducted with facility prior to introducing the loaded device into the kiln and, subsequently to treatment within said kiln, to permit the ready unloading of the treated products from the carrying device; to construct the carrying device of materials capable of resisting the action of heat within the kiln, and to thus provide for the repeated use of the carrying device, with a view to attaining economy in the service of the individual carrying devices for the reason that they might remain in service indefinitely and during repeated heatings of successive products; and to proved for the flow or the circulation of heat through and within the carrying device and into the required intimate contact with the ceramic products as well as for the flow or circulation of air during the stages of preheating the devices and their loads prior to firing, and for the free radiation of heat from the ceramic products during the stage of cooling such products and the carrying devices within the cooling zone of the kiln or while undergoing the cooling operation by exposure in the open air.

Our invention is useful for the treatment of that kind of ceramic products known as wall tiles and floor tiles, and more particularly, for the heat treatment of coated tiles in firing the coating and producing a glaze on the face or faces of such tiles. Furthermore, our invention provides a substitute for the saggers so commonly, or now almost universally used, in the manufacture of wall and floor tiles, and other ceramic products. Although we have mentioned that our invention is adapted for particular kinds of ceramic products, and as a substitute for saggers, it will be understood, of course, that the invention is not restricted or confined to the particular product mentioned, for obviously it may be utilized for handling ceramic products of other kinds, and, furthermore, the invention may if desired be used in connection with saggers for loading ceramic products within such saggers and for unloading the treated products therefrom.

Our invention is susceptible of embodiment in various constructional forms, some of which are illustrated in the accompanying drawings, wherein—

Figure 1 is a perspective view of one form of our carrying device composed of two series of substantially horizontal members assembled into operative relation and united to produce a unitary structure capable of being handled with a load of ceramic products as a unit to facilitate the operations of introducing a determined quantity of ceramic products into a kiln and of removing such products with facility from the kiln.

Figure 2 is a vertical cross section of the carrying device.

Figure 3 is a detail perspective view of one of the horizontal members to show the notched form thereof.

Figure 4 is a vertical detail section in an enlarged scale, and taken on the line 4—4 of Figure 2.

Figure 5 is a perspective view of another form of our carrying device wherein tiles irregular in form may be loaded up to a predetermined capacity.

Figure 6 is a side view illustrating the manner of loading irregularly shaped tiles on the carrying device.

Figure 7 is a detail view of one of the horizontal members of the device shown in Figures 5 and 6.

Figure 7a is a vertical section on the line 7a—7a of Figure 6.

Figure 8 is a perspective view of another form of our carrying device wherein each horizontal member of a series is in the form of a substantially flat plate.

Figure 9 is a view in side elevation of the carrying device of Figure 8, illustrating one way of loading the device with flat tiles.

Figure 10 is a detail sectional view of the device of Figures 8 and 9, on the line 10—10 of Figure 9, showing means for uniting the components of the device into a unitary structure.

Figure 11 is an elevation showing the assembly of a plurality of the plate-like devices for supporting a series of irregularly shaped tiles.

Before proceeding to a detailed description of the various constructional forms of the invention illustrated in the drawings, it is desired to have it appear that our carrier in all its forms is composed of ceramic material for the purpose, mainly, of resisting and withstanding the heating effect of the relatively high temperatures used in a tunnel kiln for the performance of the operations required in the treatment of the ceramic material, and, also, to enable such carrier to be used repeatedly in the treatment of successive charges of ceramic material adapted to be loaded upon the carrier. Furthermore, our invention is of skeleton formation with a view to permitting the free and practically unobstructed flow and circulation of heat within and through all parts of the carrier, and thus the heat has access freely to the ceramic products and all parts thereof, our carrier performing the functions of a sagger but acting in a more efficient manner for the purpose of supporting a desired quantity of the ceramic products or ware and for exposing each piece of the ware to the unobstructed access of heat to all parts of such ware.

Our invention possesses marked utility in supporting coated ware to be glazed and for exposing such coated ware to the temperature of a tunnel kiln of the muffle variety disclosed in our United States Patent No. 1,613,054 granted January 4, 1927, but we do not confine the use of our carrier for supporting and exposing coated ceramic ware, nor to the use of such carrier in connection with any kind of kiln, either of the muffle construction for glazing tile or of the direct fired kiln for maturing the bisque mixture or body of a ceramic product.

It may be stated, however, that a skeleton unitary carrier for use with coated ceramic products to be glazed requires a certain accuracy of construction and freedom from distortion of the components of such carrier, in order that the coated products may be supported during firing in a manner to minimize the flow or displacement of the coating relatively to the surface of the product. To these ends, we prefer to construct the components of the carrier by using for each component a bisque mixture which is pressed to the required form and to accurate dimensions, and thereafter is fired in a kiln to an approximate maturing temperature. In the production of the carrier from the pressed and fired components we assemble the individual pieces and build up the carrier to the required dimensions, and in the conduct of such assemblage, the individual components are united one to the other by the use of a high fire glaze cement so as to be attached one to the other and result in an open work or cage-like carrier adapted to be handled with facility as a one-piece unit and to be loaded with ware, the individual pieces of which are spaced relatively to each other, and which individual pieces of ware are exposed to heat while such pieces are retained and supported in a level condition, to the end that the coating when fused to produce the glaze will not flow over the edges of the ceramic ware, nor be displaced with respect to the surface of such individual pieces of ware.

Referring now to a practical form shown in Figures 1, 2, 3 and 4, the carrier comprises four series of members A B C D each member being in a horizontal position, and the numerous members being arranged in spaced relation so as to produce an openwork or cage-like structure of unitary skeletonized formation. The members A are in vertical series; the members B are parallel to members A and likewise are in vertical series; members C are in vertical series but are in crossing relation to members A and B; whereas members D are parallel one to the other and to members C but are in vertical series and in crossing relation to members A and B.

The members are assembled in pairs with the components of each pair in spaced relation parallel to each other, and the individual members are joined at the places of intersection or crossing by a high fire glaze cement which bonds with the components and unites all of them into a unitary structure adapted to be handled with ease and facility, in contradistinction to the heavy cumbersome saggers now so commonly employed for the handling of ceramic ware such as floor and wall tile, and other ceramic products.

Each component of our carrier is composed of ceramic material to withstand the high temperature of the kiln into which the carrier with its load of ware is conveyed. To this end, a bisque mixture is employed, the same being molded and subjected to pressure in a mold or die of a press, in order to impart to said bisque mixture the required form and dimensions and to attain the precision and accuracy required in a carrier for exposing ceramic ware coated with a composition which when fused produces a glaze upon the surface of the ware. It is preferred to provide each member A or B with notches, a, in the face of said member, said notches being located near the respective ends of said members, and each notch being comparatively shallow and of dimensions to receive an edge of one of the adjacent components C or D. The members are assembled by placing the two components of a pair upon a suitable table or other support; then the next pair are imposed upon the two previously laid members so that the two last assembled shall be at right angles to the two first assembled, and thus the structure is built up to the required height for producing a structure of the desired carrying capacity. In the assemblage of the components, a glaze cement is applied in the notches "a" of members A B, and members C D are arranged to fit into said notches "a", and to be cemented to the members A, B, such interfitting of members C D in the notches "a" of members A B effecting a mechanical interlock of the various components which contributes materially to the structural stability of the unit. The components are bonded together into a rigid structure by the glaze cement, and such cement is fused and adhesively attached to the components by placing the structure in a kiln and exposing such structure to the temperature therein. The carrier resulting from the assemblage of the components, the adhesive attachment by the glaze cement, and the preliminary firing in the kiln is thereafter usable for supporting and exposing the ceramic ware within a kiln. To thus use the carrier, it is first placed upon a table, or other support, and the attendant workman proceeds to load said carrier with ceramic ware, the latter having been previously coated with a glaze forming composition of a desired character. The coated ware is placed by the workman within the carrier by introducing it between the members A B C D, with the coated surface of the ware uppermost, said carrier being loaded from the top downward by placing the first piece of ware upon the top members A B, the second piece of ware being then placed upon the succeeding two members A, B, and so on from the top toward the bottom, such method of loading the ware upon the carrier being desirable in order to minimize the deposit of fragments of ware upon the lower pieces as is liable to occur should the carrier be loaded from the bottom upward. The loaded carrier is now placed upon a conveyor of one kind or another, and with other similarly loaded carriers the ware is moved at the usual slow speed into and through the kiln, in order to subject the ware to the usual preheating, firing and cooling stages. The ware is exposed in the high heat zone to a temperature which fuses the coating on the surfaces of the ware and converts the coating into a glaze which covers the top surface of the ware, with or without covering the edge portions of such ware; but at this stage, the coated ware is supported in a level or truly horizontal condition in order to preclude the flow of the glaze over and upon the edges of the ware, and it is to be noted that at all stages of the treatment the pieces of ware are separated for the free and unobstructed flow between them of hot air in the preheating kiln zone, of high heat in the firing zone, and in the cooling zone the heat is radiated from the ware without obstruction from the carrier or "setter" (so called) to the end that said ware is reduced in temperature within the cooling zone of the kiln by radiation and dissipation of the heat present in the ware, so that when the loaded carrier emerges from the kiln such ware is cooled down almost to atmospheric temperature prevalent outside of the kiln, although the final cooling stage of the ware may if desired take place outside of the kiln and by exposure to the atmospheric air.

The constructional form of carrier or "setter" shown in Figures 5 and 6 of the drawings is similar in construction to the form depicted in Figures 1 to 4 inclusive, and it is constructed in a similar manner by pressing, firing, assembling and cementing the individual components A, B, C, D, and thereafter heating the unitary structure for bonding such components into a rigid homogeneous structure. Such form of carrier is, however, designed for supporting irregular shaped pieces of ceramic ware, and to this end we provide the members A, B, C, D, with notches "b" in the upper faces of said members, near the ends thereof. The pieces of ware are introduced at the sides of the carrier for the inner parts of the ware to rest upon the end portions of the components A, B, C, D, and so that the edges of the ware will enter the notches "b", thus providing an interlock between the carrier and the ware imposed upon the notched end parts of the components. The pieces of ware are thus supported by and mechanically attached to the carrier at the side thereof, and such ware is exposed to the heat within the kiln for the performance of the preheating, firing and cooling operations, all as hereinbefore set forth.

In contradistinction to the bar form of members A, B, C, and D, shown in Figures 1 to 4 inclusive, and in Figures 5, 6, and 7, the carrier or setter of Figures 8, 9, and 10 comprises a series of plate-like members E and posts F each composed of ceramic material and assembled in a manner to space the members E in parallel relation, the whole being united into a rigid structure of skeleton formation for supporting and exposing pieces of ceramic ware to the kiln temperatures. Each plate-like member E is composed of bisque material, molded to the required form, pressed to accurate dimensions, and fired in a kiln, each member E being provided in the process of its manufacture with pockets "e" at the places where the members F are to be bonded to members E. The form and dimensions of plates E are not material factors in the construction of the carrier. Each member F is in the form of a short post, composed of ceramic material, molded to the desired form, pressed to accurate dimensions, and fired in a kiln. The components, having been prepared, the members E, F are assembled by arranging the posts F at right angles to the plates E, said posts being placed end on into contact with the pocket formed faces of the plates, and a glaze cement is utilized to attach the end parts of the posts to the pockets or depressed parts of the plates, thus mechanically locking members E F together, after which the structure is placed in a kiln and the cement fired for the purpose of bonding the parts E F into a rigid homogeneous structure wherein the plates are mechanically separated by the interposed posts and provision is thus made for introducing the coated ware into the spaces between the posts whereby the ware, with the coated surfaces uppermost, is carried by the plates E, provision being made for the flow of heat through the carrier and into intimate contact with the ware and the coated surfaces thereof.

The carrier of Figures 8, 9 and 10 is useful more particularly for the larger pieces of flat ceramic ware adapted to be placed upon the plate members E and to be retained against dislodgment thereon by the posts F, but to preclude the contact with said posts of the coated edges of the ware adjacent to the coated surfaces of such ware, it is preferred to give a particular form to the interposed posts F. As shown, each post tapers from the top toward the base, said post being substantially pyramidal in form. The tapering posts are thus of less cross sectional dimensions at the top than at the bottom. The tile is introduced with the coated faces uppermost, and when thus introduced the lower edge of the tile may contact with one post or another F, with the result that the edge next to the coated top face of the tile does not, and cannot, contact with the post F because the part near the top is of less cross section than the base part, whereby the coating on the edge of the ware next to the coated top surface will not be scraped off the ware by sliding or rubbing contact of such ware with the posts.

The carrier or setter of Figures 8, 9 and 10 is used ordinarily as an individual supporting means for a series of pieces of coated ware, but in Figure 11 there is shown an adaptation of our invention whereby a plurality of carriers may be utilized for supporting larger pieces of ware the dimensions of which exceed the space between the posts F, or larger pieces of ware irregular in form may be supported by an assembly of units. Two of the unitary structures are placed side by side on the kiln conveyor, said structures being relatively spaced, and ware of a desired size or shape, or ware which may be large and irregular, is loaded on the marginal portions of the plate-like members E of such juxtaposed units, as indicated in Figure 11.

In our invention the repeated use of the carrier does not result in appreciable distortion of the components under the action of the kiln temperatures for the reason, mainly, that all parts of the carrier are composed of ceramic bisque materials, and the components are made accurately and fired, to the end that no distortion, or practically no distortion, takes place. The carrier is light in weight, although of substantial construction, thus enabling the carrier, even when loaded, to be handled without great muscular effort, such as required for handling the heavy saggers. The carrier is skeletonized to reduce weight as well as to expose the tile loaded thereon, and another practical advantage is that the carrier cools off quickly, for the reason that a relatively small quantity of ceramic material is employed in its construction, the relation of the amount of the ceramic material in the carrier to the load of ceramic ware imposed on the carrier being as about four parts of ceramic ware to one part of ceramic material in the carrier, whereby both war and carrier may cool off quickly by radiating the heat.

We have described a mode of making the ceramic carrier wherein the ceramic components are pressed, fired, assembled and cemented and then again fired to fuse the cement and bond the components, and while such procedure is desirable for the attainment of the precision required to support the coated tiles in a level condition during the heating operation, we do not want to be confined strictly to this particular method of making the unitary skeletonized carrier or setter, nor to the precise details or form and proportion of parts herein disclosed.

Having now described our invention, what we claim as new and desire to secure by Letters Patent is:

1. A device for supporting ceramic products and exposing the same to heat comprising a series of members positioned in relatively spaced order and constituting a rigid unitary structure affording a series of supporting surfaces arranged one above the other.

2. A skeletonized device for supporting ceramic products and exposing the same to heat comprising a series of members positioned one above the other and inseparably united into a unitary structure and constituting an open work rigid structure affording a series of supporting surfaces arranged in spaced order.

3. A device for supporting a quantity of ceramic products and exposing the same to heat comprising a series of members imposed one upon the other and constituting a rigid unitary structure affording a series of supporting surfaces for the lodgment of the products to be carried, each member being composed of ceramic material.

4. A re-usable device for supporting a quantity of ceramic products and exposing the same to heat comprising a series of superimposed members constituting a rigid unitary structure and affording a series of supporting surfaces whereon ceramic products may be loaded, said members being comprised of ceramic material.

5. A device for supporting ceramic products and exposing the same to heat comprising a skeletonized carrier the components of which are composed of ceramic material, said components constituting a unitary structure affording a series of supporting surfaces on which may be loaded the ceramic products to be exposed.

6. A device for supporting ceramic products and exposing the same to heat comprising a rack formed carrier the parts of which are composed of ceramic material substantially free from distortion under the effect of heat, said parts being inseparably united and producing an open-work unitary structure.

7. A device for supporting and exposing products to be heated comprising a rack formed carrier the components of which are inseparably bonded into an open-work unitary structure and said components being composed of pre-fired ceramic material substantially free from distortion under the effect of heat.

8. A device for supporting and exposing products to be heated comprising an open work carrier the elements of which are composed of pressed and pre-fired ceramic material constituting a unitary structure free from distortion under the effects of heat.

9. A device for supporting and exposing products to be heated comprising a carrier the parts of which are composed of pre-fired ceramic material constituting a unitary structure substantially free from distortion under changes in temperature occasioned by heat and by exposure to a cooling atmosphere.

10. A device for supporting and exposing ceramic products comprising a carrier provided with multiple open spaces for the free flow therein of heat and a cooling atmosphere, the parts of said carrier being composed of ceramic material constituting a unitary structure substantially free from distortion under the effect of heat and upon exposure to a cooling atmosphere.

11. A device for supporting and exposing ceramic products comprising a carrier having open spaces therethrough for the flow of heat and of a cooling atmosphere, said carrier embodying parts composed of pre-fired ceramic material and constituting a unitary structure presenting supporting surfaces which are positioned one above the other.

12. A device for supporting and exposing ceramic products comprising a carrier having open spaces therethrough for the flow of heat and for the free radiation of heat from the ceramic material, said carrier embodying parts composed of ceramic material constituting a unitary structure substantially free from distortion and the effects of heat and of a cooling atmosphere.

13. A device for supporting and exposing ceramic products comprising a carrier having open spaces, said carrier embodying multiple parts composed of pre-fired ceramic material assembled and bonded into a unitary structure.

14. A device for supporting and exposing ceramic products comprising a carrier with open spaces therein, said carrier embodying parts composed of ceramic material assembled in determined relation and said parts cemented one to the other and heated for binding all the parts into a unitary structure.

15. A ceramic product carrier embodying a plurality of parts composed of ceramic material assembled into determined relation to produce open spaces and united into a unitary structure, some of said parts being provided with notches.

16. A ceramic product carrier of the class described embodying parts composed of ceramic material assembled and bonded into a unitary structure with open spaces through said carrier, some of said parts being provided with retaining notches.

17. A ceramic product carrier of the class described embodying notched parts and other parts free from said notches, all of said parts being composed of ceramic material assembled into a unitary structure with open spaces for the radiation of heat and for the flow of heat and of a cooling atmosphere.

18. A ceramic product carrier of the class described embodying multiple parts some of which are recessed for interfitting engagement with other parts, all of said parts being composed of ceramic material constituting a unitary structure with open spaces for the flow of heat therethrough.

19. A ceramic product carrier embodying multiple parts each composed of ceramic material, said parts being inseparably bonded together and constituting a unitary structure with open spaces therethrough for the free flow of heat.

20. A carrier of the class described embodying multiple parts each composed of pre-pressed and pre-fired ceramic material and assembled and bonded into a unitary structure substantially free from distortion and provided with multiple open spaces for the free flow therethrough of heat and of a cooling atmosphere.

21. A carrier of the class described comprising multiple parts each composed of ceramic material assembled and united to produce a unitary structure substantially free from distortion and provided with multiple open spaces for the flow of heat and for the radiation of heat from material loaded on said carrier.

22. A carrier of the class described embodying multiple parts each composed of ceramic material and said parts being made separately by pressing and firing such material to accurate dimensions and determined form, said parts being assembled and united into a rigid structure having multiple open spaces for the free flow therethrough of heat and of a cooling atmosphere.

23. A carrier of the class described embodying multiple parts each composed of ceramic material, said parts being assembled and bonded into a rigid structure with open spaces for the free flow of heat, certain of said parts being tapering to provide for the introduction of a coated product without displacing the coated material from such product.

In testimony whereof we have signed this specification this 23rd day of February, 1927.

THEODORE C. PROUTY.
WILLIS OSWALD PROUTY.